(12) United States Patent
Becker et al.

(10) Patent No.: US 8,438,537 B2
(45) Date of Patent: May 7, 2013

(54) SYSTEM ARRANGEMENT AND METHOD FOR AUTOMATED APPLICATION DEVELOPMENT WITH USER GUIDANCE

(75) Inventors: Detlef Becker, Moehrendorf (DE); Karlheinz Dorn, Kalchreuth (DE); Christian Scharf, Herzogenaurach (DE); Vladyslav Ukis, Nuremberg (DE); Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1417 days.

(21) Appl. No.: 11/367,304

(22) Filed: Mar. 6, 2006

(65) Prior Publication Data

US 2006/0206858 A1    Sep. 14, 2006

Related U.S. Application Data

(60) Provisional application No. 60/658,701, filed on Mar. 7, 2005.

(51) Int. Cl.
*G06F 9/44* (2006.01)
*G06F 17/00* (2006.01)

(52) U.S. Cl.
USPC ............ 717/120; 717/104; 717/109; 715/200

(58) Field of Classification Search .................. 717/104, 717/106, 107, 114, 116, 115, 120, 121; 715/234, 715/760; 709/715, 203, 217, 230
See application file for complete search history.

(56) References Cited

U.S. PATENT DOCUMENTS

| | | | |
|---|---|---|---|
| 6,601,233 B1* | 7/2003 | Underwood ................... | 717/102 |
| 7,448,022 B1* | 11/2008 | Ram et al. ...................... | 717/120 |
| 2001/0054066 A1* | 12/2001 | Spitzer .......................... | 709/203 |
| 2002/0019884 A1* | 2/2002 | Gungabeesoon ............. | 709/310 |
| 2002/0138543 A1* | 9/2002 | Teng et al. .................... | 709/102 |
| 2003/0018769 A1* | 1/2003 | Foulger et al. ................ | 709/223 |
| 2004/0015842 A1* | 1/2004 | Nanivadekar et al. ........ | 717/109 |
| 2004/0186915 A1* | 9/2004 | Blaszczak et al. ............. | 709/246 |
| 2005/0091400 A1* | 4/2005 | Hartley .......................... | 709/238 |
| 2007/0150562 A1* | 6/2007 | Stull et al. ..................... | 709/223 |

OTHER PUBLICATIONS

"Oracle Application Development Framework Overview". An Oracle White Paper, Apr. 2004.
German Search Report dated Oct. 27, 2005.

* cited by examiner

*Primary Examiner* — S. Sough
*Assistant Examiner* — Carina Yun
(74) *Attorney, Agent, or Firm* — Harness, Dickey & Pierce, P.L.C.

(57) ABSTRACT

A system arrangement is disclosed for automated application development with user guidance, including at least one view component (front-end) with a plurality of presentation forms, from which, at a particular time, a respective one is intended for data viewing and for input by a user, at least one model component (back-end) for storing and retrieving data, and a controller component for forwarding user inputs and/or requests for data to the model component and for forwarding requested data to a view component. The controller component is also intended for changeover between the presentation forms. Finally, a process flow component is provided for stipulating a sequence for the changeover between the presentation forms.

16 Claims, 3 Drawing Sheets

SYSTEM ARRANGEMENT AND METHOD FOR AUTOMATED APPLICATION DEVELOPMENT WITH USER GUIDANCE

The present application hereby claims priority under 35 U.S.C. §119 on U.S. provisional patent application No. 60/658,701 filed Mar. 7, 2005, the entire contents of which is hereby incorporated herein by reference.

FIELD

Today's software architectures usually provide the option of designing front-end and backend logic according to particular specifications in order to achieve homogenization of the software and to structure the software. This permits application software development which produces software applications. In this context, front-end logic is understood to include preparatory program logic, whereas the aim of backend logic is later processing steps, e.g. storage and recovery of information in a database. Ordinary applications have the characteristic of being monolithic, which, with extended use of the application, results in it being extremely difficult to implement changed or new demands of the application in said application. The particular reason for this is that today's software architectures provide next to no support for inter-application problems.

BACKGROUND

There is no sub-application concept today. In addition, today's software architectures provide no support for the flow of data within an application. Rather, the user is reliant on his own resources when handling requests, inputting new information, obtaining information from databases etc., particularly for complex processes covering a plurality of individual sections of logic.

In addition, today's software architectures are distinguished in that the programming models in the front-end and the backend are fundamentally different, which has even given rise to specific teams of software developers, namely front-end developers and back-end developers. Such specialization can have a disadvantageous effect on the whole development process, particularly the costs, however.

Today's software architectures also provide no support for the flow of data within an application, which can sometimes lead to confusing and uncontrolled data interchange in the application and is susceptible to error. Errors can also be made by the user if he is not assisted in his work by a particular arrangement of individual work steps from the software system, but rather is reliant on creating an operational plan himself.

Furthermore, the previous practice based on the known art has an associated security risk, since the development state is not saved in the event of an (unintended) system interruption. As an example, the Oracle White Paper, dated April 2004, entitled "Oracle Application Development Framework Overview", likewise shows a framework for creating software architectures. However, it disadvantageously contains no security logic which, in particular, allows states adopted by the system to be stored such that in the event of a fault there is the certainty of error-free resumption of operation.

SUMMARY

At least one embodiment of the invention includes an object of providing a software system arrangement and/or an appropriate method which improves the previous practice. For example, it may provide the application engineer with structured guidance in development, with a simultaneous increase in the security of the system.

An object may be achieved by a system for automated user guidance during application development. Further advantageous aspects, details and refinements can be found in the detailed description and appended drawings.

A classical system includes a view component which is responsible for displaying the data and can display these data in various forms, such as tables, lists etc. The classical system also includes a model component as the backend, which is responsible for data storage and possesses knowledge about the type of data storage. The third part in a previously known system is a controller component or a controller, which logically fits in between the view component and the model component.

The controller component processes the user interactions (keyboard, mouse events etc.), converts them into data requests to the model component and sends them to the model component. When the model component has returned the data, they are forwarded from the controller component to the view component, where they are displayed in the manner desired by the user. The advantage of this flow is that it is possible to alter both the type of data storage and the type of data display without having to modify the whole software system. The controller component acts as the mediator between "view" and "model". The view is therefore unaffected by changes in the model, and in the same way the model is immune to changes in the view.

Accordingly, the inventive system arrangement, of at least one embodiment, for automatic user guidance during application development includes:

at least one view component (front-end) with a plurality of presentation forms, from which, at a particular time, a respective one is intended for data viewing and for input by a user, at least one model component (back-end) for storing and retrieving data, a controller component for forwarding user inputs and/or requests for data to the model component and for forwarding requested data to a view component, the controller component also being intended for changeover between the presentation forms, and a process flow component for stipulating a sequence for the changeover between the presentation forms, and a state manager, which is intended for storing states for the other parts of the system when said system is interrupted and for restoring the states when the system resumes.

In at least one example embodiment, the process flow component is intended to provide a configurable flow. In this context, configurable is intended to include that the flow can be specifically adapted for each development process and can be set by the user.

The process flow component is provided in order to be able to provide a configurable sequence for the changeover between the views. In addition, it may be provided in order to provide a configurable sequence for processing steps during application development.

The novel architecture introduces a new dimension called a process flow component or "process". This dimension addresses the problems mentioned above which are related to the fact that the flow of data within an application can become chaotic if the software architecture on which the application or its development is based provides no support for organizing and directing the flow of data. The process flow component makes it possible to achieve the aim of performing workflow automation, so that the software user is assisted in his decisions by a configurable sequence of data processing steps. This affords the advantage that fewer errors can be produced.

Just like a view component based on at least one embodiment of the invention has a plurality of presentation forms, the model component can also be structured so that it has a plurality of business forms for the data storage, which are each logically connected to at least one presentation form, the changeover between presentation forms being coupled to corresponding changeover between business forms.

In this context, a business form is to be understood to include a particular program-based method of storing, requesting and conditioning the data from a database or a similar data reservoir. This allows the flow of data to be optimized if a tailored business form is available for each presentation form or a group of presentation forms.

In another example embodiment, the presentation forms and possibly, if present, the business forms are arranged in a hierarchy, so that the sequence of the changeover within one hierarchical level takes place when the sequence of the changeover in the next lowest hierarchical level has been performed. In practice, each presentation form and each business form, for example, can also include tasks which are activated, called and processed in succession.

This allows structured control of the user guidance down to a level at which a developer is forced to input a particular field on a form or a specially formatted input on the command line. Preferably, the process flow component can take prescribed events during the user input in a view as a basis for instructing the controller component to use the stipulated sequence to change over between two presentation forms and, if appropriate, between two business forms.

In this context, the respective user inputs made are evaluated, and after particular demands on the user inputs have been completed the process flow component can produce particular conditions so as then to change the presentation form for the user input. It goes without saying that other "triggers" for the changeover are also possible, for example a particular time elapsing since the presentation form was displayed or an explicit user action which makes it clear that he has processed the current presentation form fully (for example pressing a Return key).

Advantageously, the sequence of presentation forms is determined by a configuration file for the process flow component which is read and stipulates which presentation form is to be transferred next.

Changeover between two presentation forms is affected in the following way: when the user has finished the last task in the sub-data flow, the next step in the primary data flow is started. The steps in the primary data flow are configured in the navigation graph. That is to say that the navigation graph stipulates in what order the views are transferred.

The view component may in turn be divided into a plurality of subcomponents in order to allow structured programming. By way of example, the view component can be divided into a generic "front-end" component and an actual presentation form, the former being suitable for providing the basic functionalities for displaying data and the latter defining the specific form of presentation for these data.

Accordingly, at least one embodiment of the inventive system may also have a view manager for producing generic front-end program components for the at least one view component. In addition, it may equally have a model manager for producing generic back-end program components for the at least one model component. In this case, production of the front-end program components and back-end program components by their respective managers can likewise be controlled or at least started by the process flow component. Whereas separate managers are used for producing the generic back-end and front-end components, the actual presentation forms and business forms can be produced by the controller component. Accordingly, the controller component can contain or process program code for producing the presentation forms of the view component.

The controller component may likewise contain or process program code for producing the models of the view component.

The program code may be a configuration file, for example, particularly may be based on XML.

In addition, the system arrangement contains a state manager which is intended for storing states for the other parts of the system when the system is interrupted (or suspended) and for restoring the states when the system is resumed. This allows the inventive system arrangement to be interrupted or put into an idle state and reactivated again in exactly the same state without the need to restart the processing operation completely.

At least one embodiment of the inventive system arrangement can be executed locally on a computer or else on a network, with at least the model component and the view components being able to run on different computers connected to one another via a network. Accordingly, it is preferred that the system arrangement has at least one view component for local use at operating system level, i.e. on a single computer, and at least one view component for network use using network protocols. The completely different type of conditioning for local display, e.g. using X-Windows, PDF, Postscript or GDI, in comparison with presentation using a network, such as using HTML, XML or specific protocols, means that specific view components are also required (it should be noted that X-Windows and Display Postscript variants can be used either locally or over a network, which means that no different view components ought to be necessary in this case). There are basically various options available for implementing the necessary program code, if not for the individual components of at least one embodiment of the inventive system arrangement then for its interaction and execution.

At least one embodiment of the inventive system arrangement may also provide at least one device for data buffer-storage for changeover of the presentation forms in order to be able to continue to use the data obtained in one presentation form in other presentation forms. The data buffer-storage can be performed by the process flow component and can be performed in a memory area of the controller component which is accessible via "ports", for example.

In one example embodiment, the program code for producing and configuring the components of the system arrangement is a code written in a script language. Thus, even after the system arrangement has been set up, it can still be changed at any time by simply changing the script code, and hence maintenance of the system arrangement is simple.

The inventive embodiments of the method which have been described above may also be in the form of a computer program product, the computer being prompted to carry out the inventive method described above and its program code being executed by a processor.

An alternative way of achieving the object provides a storage medium which is intended for storing the computer-implemented method described above and can be read by a computer.

It is also possible for individual components of the method described above to be able to be executed in one saleable unit and for the rest of the components to be able to be executed in another saleable unit. Another way of achieving the object in line with at least one embodiment of the invention therefore involves a product, comprising:
at least one view component, a model component, a controller component and a process flow component in a distributed system which comprises means which are set up to carry out those steps of a method in accordance with at least one of the method aspects described above which are brought about by the product, with at least one further product being set up to carry out the remaining steps of the method, and the interaction of the at least two products carrying out all the steps of the method.

BRIEF DESCRIPTION OF THE DRAWINGS

The detailed description of the figures which follows discusses example embodiments (which are not to be understood as restrictive) with their features and further advantages with reference to the drawings, in which.

DETAILED DESCRIPTION OF THE EXAMPLE EMBODIMENTS

If the previously known software pattern MVC (Model• View• Controller) has a process flow component added to it, the user interaction with the software system can be provided with a configurable pattern of executable steps which (pattern) the software system should provide for the application developer or user as a sequence. As a result of specification of the steps in a particular order, the view component will request the data from the model component via the controller component in precisely this order, so that the software assists the developer in his decisions by via guidance through the steps.

Figure 1:
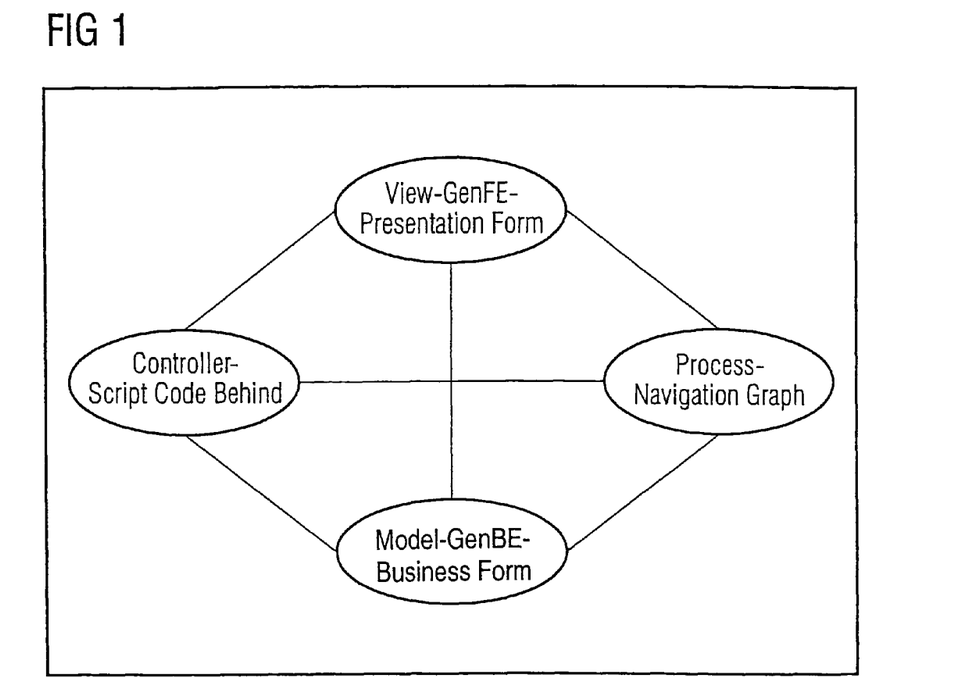
FIG. 1 shows an architecture for at least one embodiment of the inventive system arrangement.

FIG. 1 gives an overview of the inventively provided architecture of the system arrangement for user guidance. The view communicates with the model via the controller. In this case, the inventive process is responsible for the arrangement or order of these interactions and stipulates the order in which the interactions are to take place. This process is performed by the "navigation graph", a configuration file. The navigation graph holds the information regarding what step is to be performed next after a processing step which has taken place. In a hierarchical arrangement, the navigation graph is complemented by further sub-navigation graphs, for example for sequences of particular "tasks". The text below is intended to shed more light on the structures of the components in the inventive system.

For the development of the architecture, great value has been placed on the symmetry of the application constituents. The view is represented by the "generic front-end" (GenFE) and the model is represented by the generic back-end (GenBE). Both contain generic implementations of containers. The GenFE is the generic container for visual front portions of the application and the GenBE is the generic container for backend portions of the application. The communication between these components of the front-end and back-end is controlled via the controller component.

As can be seen from FIG. 1, both the GenFe and the GenBE contain a respective "form", that is to say a representation for presenting data and for inputting the data, or for formatted editing. The front-end contains a presentation form hosted by the GenFE, and the back-end contains a business form hosted by the GenBE.

Both forms are based on the idea that it makes sense to specify the components of a software layer (front-end or back-end components) and their interaction options in a configuration file and to have them produced by the "form". The actual interactions are localized and are programmed in one or more files, preferably in a script language, so that the layer user can flexibly adapt both the form content comprising configured components and the component interactions without having to modify the entire layer.

Figure 2:
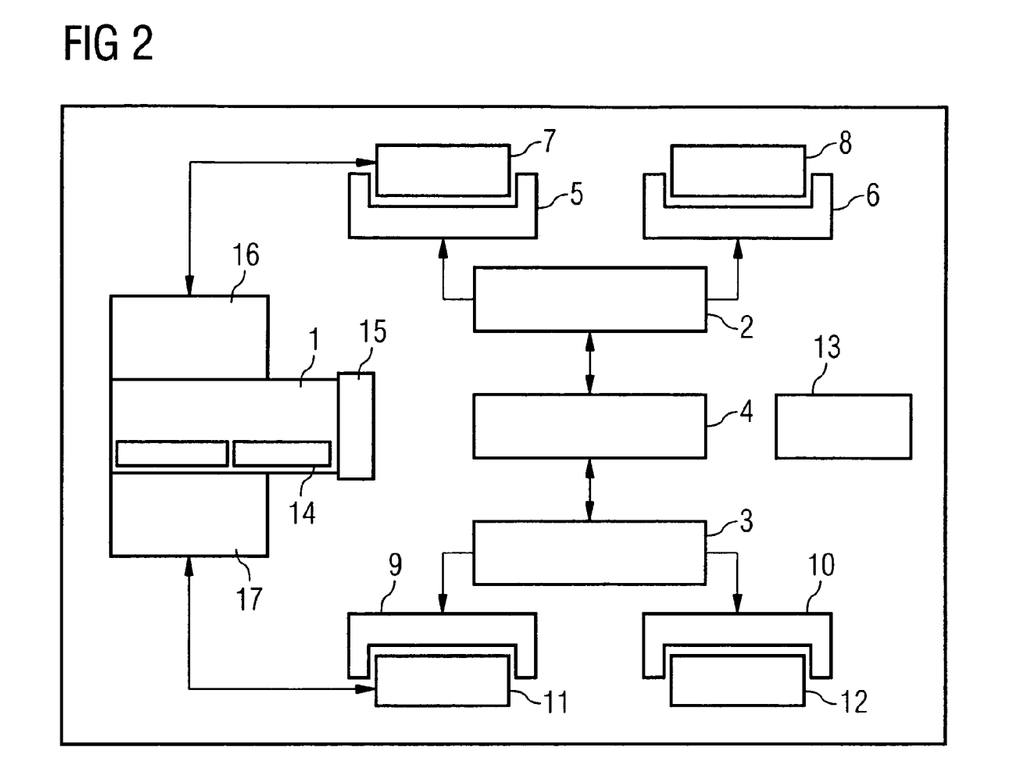
FIG. 2 shows individual components forming at least one embodiment of the inventive system arrangement.

FIG. 2 shows that the script code for the two forms resides in the controller in the example embodiment, which is called Script Code Behind. This affords advantages even if the display program component has to represent data in various technologies, such as locally or over a network, e.g. using WinForms or WebForms. If the script code of the presentation form is running in the controller, the component interactions do not necessarily need to be altered when the type of representation of the front-end components changes. These "forms" have already been defined at an earlier time.

Today's software architectures are distinguished in that the programming models in the front-end and back-end are fundamentally different. The asymmetries in the front-end and back-end development can be noticeably reduced though by the use of form concepts in at least one embodiment of the inventive architecture presented here.

A refined model of at least one embodiment of the inventive system is shown by a schematic structure in FIG. 2. The four core elements of at least one embodiment of the inventive architecture can clearly be seen in FIG. 2. The four active primary components are a controller 1, a view manager 2, a model manager 3 and the inventive process, i.e. the process flow program component 4. The view manager 2 produces generic front-end components 5, 6, which in turn use script code to produce a respective presentation form 7, 8 which is described and processed by the front-end logic of the application.

The feature worthy of note in this refinement of at least one embodiment of the invention is that the view manager 2 is configurable and, in the example presented in FIG. 4, there are two view managers 2 for different technologies (WebForm and WinForm). The external configuration selects, produces and uses a particular view manager 2. The WinForm front-end components 5, 7 can be used on the desktop under Windows, and the WebForm front-ends 6, 8 are used when the inventive system is used on the web. During web use, the container or overall container runs on a web server. Typically, a decision is made under Windows for Microsoft Internet Information Server (IIS).

At least one embodiment of the inventive system's back-end contains a model manager 3 which can produce generic back-end components 9, 10. The generic back-end components 9, 10 again produce business forms 11, 12, which are described and processed by the application's application logic, using script code 17.

The right-hand side of FIG. 2 shows the state manager 13, in which the view and model managers 2, 3 can store their state. The access to the state manager 13 is propagated as far as the forms 7, 8, 11, 12 so that the components on the respective form can store their state and read it again. With this feature, the entire system based on at least one embodiment of the invention can store its state using the state manager 13 before being suspended and can read the state again directly after it is to be resumed. It is therefore possible to interrupt processing and restart it without having to restart the processing operation entirely.

The left-hand side of FIG. 2 contains the controller component 1, which controls the communication between the front-end and the back-end. The front-end and back-end do not have to run in the same process within the operating system. It is equally possible to start two containers which each have just front-end or back-end portions, and the communication layer residing in the controller 1 ensures that the two communicating parties also find one another via a network. In addition, the controller 1 accommodates an event system 14 which ensures that the front-end and back-end of the application can produce events.

In the centre of FIG. 2, it is possible to see the fourth basic component of the inventive system architecture, the process flow program component 4 (process), represented by the navigation graph, with a data flow machine. The navigation graph contains the information about the order in which the user needs to execute particular work steps in order to develop a particular application or in order to perform a particular piece of work. The program listing below shows a configuration for the navigation graph. There, three views are transferred in succession: View__2D, View__3D and View_Filming. Hence, when the user has finished interacting with View__2D, he is transferred to View__3D. Continuing, when the user has finished with View__3D, he is transferred to View_Filming etc.

```
<navigationGraph name="Datenfluss1" startView="View__2D"
state="State" statePersist="MemoryStatePersistence"
iViewManager="UserControlViewManager">
    <node view='View__2D' screen='' subWorkFlow=''>
        <navigateTo navigateValue="previous" view='
View__Filming' />
        <navigateTo navigateValue="next" view=' View__3D ' />
    </node>
    <node view='View__3D' screen='screen1' popup='false'
subWorkFlow=''>
        <navigateTo navigateValue="previous" view=' View__2D ' />
        <navigateTo navigateValue="next" view=' View_Filming ' />
    </node>
    <node view='View_Filming' screen='screen2' subWork-
Flow='SubWorkFlow.xml'>
        <navigateTo navigateValue="previous" view=' View__3D' />
        <navigateTo navigateValue="next" view=' View__2D ' />
    </node>
</navigationGraph>
```

The associated models 11, 12 are driven by the views or presentation forms 7, 8 in this context, i.e. when changing over from one view to another the associated model 11, 12 is also automatically changed over. When changing over views, the data flow machine can also transport the data between the views. For this, there are the ports 15 provided on the controller 1 in FIG. 2. A view 7, 8 can have its finished data stored in a port by the data flow machine, and the next view can have the data flow machine fetch these data from the ports in order to process them.

The concept of the hierarchical flow control and of the associated sub-data flow is likewise part of the process aspect of at least one embodiment of the inventive system arrangement. The external data flow is described by the navigation graph shown previously and stipulates how the individual "activities" (views+models) need to be connected up. The "internal" data flow or the next lowest hierarchical level is described by the data flow "Subdatenfluss1" referenced in the program listing below and stipulates how the data flow within the activity may look.

```
<?xml version="1.0" encoding="UTF-8" ?>
- <document xmlns:xi="http://www.w3.org/2003/XInclude">
- <SUBWORKFLOW>
- <TASKS>
- <TASK name="task1">
- <!--
  <xi:include href=".\Task\task1.xml" xpointer="xpointer(//Task) "/>
  -->
    <xi:include href="..\.\Task\task1.xml" xpointer="xpointer(//Model)" />
    <xi:include href="..\.\Task\task1.xml" xpointer="xpointer(//View)" />
    </TASK>
- <TASK name="task2">
- <!--
  <xi:include href="\XML-Files\Task\task2.xml"
xpointer="xpointer(//Task) "/>
  -->
    <xi:include href="..\.\Task\task2.xml" xpointer="xpointer(//Model)" />
    <xi:include href="..\.\Task\task2.xml" xpointer="xpointer(//View)" />
    </TASK>
- <TASK name="task3">
    <xi:include href="..\.\Task\task3.xml" xpointer="xpointer(//Task)" />
    </TASK>
    </TASKS>
- <NAVIGATIONGRAPH name="Subdatenfluss1" startTask="task1">
    <xi:include href="..\.\TaskNavigationGraph\TaskNavigationGraph.xml"
xpointer="xpointer(//NODE)" />
    </NAVIGATIONGRAPH>
    </SUBWORKFLOW>
    </document>
```

Figure 3:
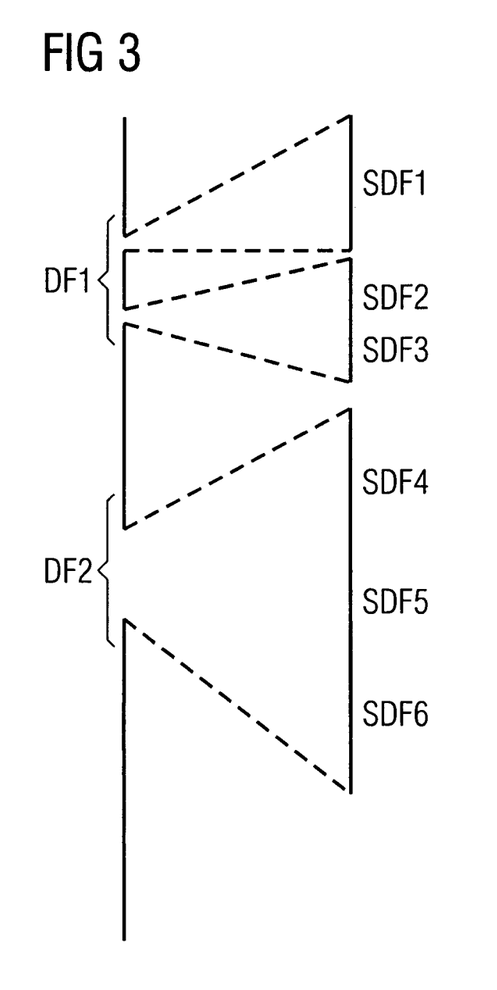
FIG. 3 shows an example of a hierarchical operational plan for the individual presentation forms.

FIG. 3 shows a schematic representation (not based on the specific example above) of the overall data flow in the system arrangement. In this case, data flow 1 (DF1) is connected up as coordinator to sub-data flows 1, 2, 3 (SDF1, SDF2, SDF3), whose output data are in turn returned to data flow 1 and, after further processing, are sent to data flow 2 (DF2), which likewise forwards the data in sub-data flows 4, 5 and 6 (SDF4, SDF5, SDF6).

The program listing above shows that each task includes a model portion and a view portion. The respective configurations are entirely normal configurations for the business and presentation form, as described. The navigation graph for connecting up tasks is shown in the program listing below:

```
<?xml version="1.0" encoding="UTF-8" ?>
- <NAVIGATIONGRAPH>
- <NODE task="task1">
    <navigateTo navigateValue="PREVIOUS" task="task3" />
    <navigateTo navigateValue="NEXT" task="task2" />
    </NODE>
- <NODE task="task2">
    <navigateTo navigateValue="PREVIOUS" task="task1" />
    <navigateTo navigateValue="NEXT" task="task3" />
    </NODE>
- <NODE task="task3">
    <navigateTo navigateValue="PREVIOUS" task="task2" />
    <navigateTo navigateValue="NEXT" task="task1" />
    </NODE>
    </NAVIGATIONGRAPH>
```

The various available components of at least one embodiment of the inventive system arrangement need to be started and connected to one another. This is also done logically using a script, which is shown in the program listing below.

```xml
<?xml version="1.0" encoding="UTF-8" ?>
- <objectTypes>
    <iViewManager name="UserControlViewManager"
type="Siemens.ApplicationBlocks.UIProcess.UserControlViewManager,
Siemens.ApplicationBlocks.UIProcess,
Version=1.0.1.0,Culture=neutral,PublicKeyToken=null" />
    <iModelManager name="MyModelManager"
type="BusnessProcess.MyModelManager, BusinessProcess,
Version=1.0.1.0,Culture=neutral,PublicKeyToken=null" />
    <state name="State"
type="Siemens.ApplicationBlocks.UIProcess.State, Siemens
.ApplicationBlocks.UIProcess,
Version=1.0.1.0,Culture=neutral,PublicKeyToken=null" />
    <controller name="ActivityWorkflowController"
type="UIPUtil.ActivityWorkflowController, UIPUtil,
Version=1.0.1.0,Culture=neutral,PublicKeyToken=null" />
    <statePersistenceProvider name="MemoryStatePersistence"
type="Siemens.ApplicationBlocks.UIProcess.MemoryStatePersistence,
Siemens.ApplicationBlocks.UIProcess,
Version=1.0.1.0,Culture=neutral,PublicKeyToken=null" />
  </objectTypes>
```

The program listing above shows the configuration of the referenced object types to which reference is made in the further course of the configuration. This defines the view manager 2, the model manager 3, the state manager 13 and the controller 1.

The program listing below shows the configuration of an "activity" which reflects the whole system arrangement based on at least one embodiment of the invention. This defines a model, a view and a controller. The controller is referenced by way of the activity work flow controller. The actual definition has already been given in the configuration of the object types in the program listing above.

```xml
<?xml version="1.0" encoding="UTF-8" ?>
- <Activity>
    <Model name="MyModel_1" type="BusinessProcess.MyModel,
BusinessProcess,
Version=1.0.1.0, Culture=neutral, PublicKeyToken=null"
iModelManager="MyModelManager"
config-
File="\AT\dotNet\Core\BusinessForm\test.u\config\
BizFormConfig.xml"
CMDPATTERN="cmdPtn1" EVENTPATTERN="eventPtn1" />
    <View name="Activity1" type="syngo.Common.Activity.Activity,
Activity, Version=1.0.1.0,Culture=neutral, PublicKeyToken=null"
configFile="./PresentationContent/UI_Activity1xml"
CMDPATTERN="cmdPtn1" EVENTPATTERN="eventPtn1" />
    <Controller name="ActivityWorkflowController" />
  </Activity>
```

The program listing shown below illustrates a complete configuration for an application with data and a sub-data flow.

```xml
<?xml version="1.0" encoding="UTF-8" ?>
- <document xmlns:xi="http://www.w3.org/2003/XInclude">
- <workflow>
- <!--
  <objectTypes>
  -->
- <objectTypes xml:base="ObjectTypes/ObjectTypes.xml">
    <iViewManager name="UserControlViewManager"
type="Siemens.ApplicationBlocks.UIProcess.UserControlViewManager,
Siemens.ApplicationBlocks.UIProcess,
Version=1.0.1.0,Culture=neutral,PublicKeyToken=null" />
    <iModelManager name="MyModelManager"
type="BusinessProcess.MyModelManager, BusinessProcess,
Version=1.0.1.0,Culture=neutral,PublicKeyToken=null" />
    <state name="State"
type="Siemens.ApplicationBlocks.UIProcess.State,
Siemens.ApplicationBlocks.UIProcess,
Version=1.0.1.0,Culture=neutral,PublicKeyToken=null" />
    <controller name="ActivityWorkflowController"
type="UIPUtil.ActivityWorkflowController, UIPUtil,
Version=1.0.1.0,Culture=neutral,PublicKeyToken=null" />
    <statePersistenceProvider name="MemoryStatePersistence"
type="Siemens.ApplicationBlocks.UIProcess.MemoryStatePersistence,
Siemens.ApplicationBlocks.UIProcess,
Version=1.0.1.0,Culture=neutral,PublicKeyToken=null" />
  </objectTypes>
- <!--
  </objectTypes>
  -->
- <Activities>
- <Activity name="Activity1">
    <Model name="MyModel_1" type="BusinessProcess.MyModel, BusinessProcess,
Version=1.0.1.0, Culture=neutral, PublicKeyToken=null"
iModelManager="MyModelManager" config-
File="\AT\dotNet\Core\BusinessForm\test.u\config\BizFormConfig.xml"
CMDPATTERN="cmdPtn1" EVENTPATTERN="eventPtn1"
xml:base="Activity/Activity1.xml" />
    <View name="Activity1" type="syngo.Common.Activity.Activity, Activity,
Version=1.0.1.0,Culture=neutral,PublicKeyToken=null" config-
File="./PresentationContent/UI_Activity1xml" CMDPATTERN="cmdPtn1"
EVENTPATTERN="eventPtn1" xml:base="Activity/Activity1.xml" />
    <Controller name="ActivityWorkflowController"
xml:base="Activity/Activity1.xml" />
- <SUBWORKFLOW xml:base="Subworkflow/Subworkflow1.xml">
```

-continued

```
- <TASKS>
- <TASK name="task1">
- <!--
  <xi:include href=".\Task\task1.xml" xpointer="xpointer(//Task) "/>
  -->
    <Model name="task1" ID="group1" PATTERNCMD="pat1"
PATTERNEVT="evt1" FILE=".\BusinessContent\step1_Model.xml"
xml:base="Task/task1.xml" />
    <View name="task1" ID="group1" PATTERNCMD="pat1" PATTERNEVT="evt1"
FILE=".\PresentationContent\subworkflow_step1.xml"
xml:base="Task/task1.xml" />
    </TASK>
- <TASK name="task2">
- <!--
  <xi:include href=".\XML-Files\Task\task2.xml"
xpointer="xpointer(//Task) "/>
  -->
    <Model name="task2" ID="group2" PATTERNCMD="pat2"
PATTERNEVT="evt2" FILE=".\BusinessContent\step2_Model.xml"
xml:base="Task/task2.xml" />
    <View name="task2" ID="group2" PATTERNCMD="pat2" PATTERNEVT="evt2"
FILE=".\PresentationContent\subworkflow_step2.xml"
xml:base="Task/task2.xml" />
    </TASK>
- <TASK name="task3">
- <Task xml:base="Task/task3.xml">
    <Model name="task3" ID="group3" PATTERNCMD="pat3"
PATTERNEVT="evt3" FILE=".\BusinessContent\step3_Model.xml" />
    <View name="task3" ID="group3" PATTERNCMD="pat3" PATTERNEVT="evt3"
FILE=".\PresentationContent\subworkflow_step3.xml" />
    </Task>
    </TASK>
    </TASKS>
- <NAVIGATIONGRAPH name="navgraph1" startTask="task1">
- <!--
  <xi:include href=".\TaskNavigationGraph\TaskNavigationGraph.xml"
xpointer="xpointer(//NAVIGATIONGRAPH) "/>
  -->
- <NODE task="task1"
xml:base="TaskNavigationGraph/TaskNavigationGraph.xml">
    <navigateTo navigateValue="PREVIOUS" task="task3" />
    <navigateTo navigateValue="NEXT" task="task2" />
    </NODE>
- <NODE task="task2"
xml:base="TaskNavigationGraph/TaskNavigationGraph.xml">
    <navigateTo navigateValue="PREVIOUS" task="task1" />
    <navigateTo navigateValue="NEXT" task="task3" />
    </NODE>
- <NODE task="task3"
xml:base="TaskNavigationGraph/TaskNavigationGraph.xml">
    <navigateTo navigateValue="PREVIOUS" task="task2" />
    <navigateTo navigateValue="NEXT" task="task1" />
    </NODE>
    </NAVIGATIONGRAPH>
    </SUBWORKFLOW>
    </Activity>
- <Activity name="Activity2">
- <Activity xml:base="Activity/Activity2.xml">
    <Model name="MyModel_2" type="BusinessProcess.MyModel, BusinessProcess,
Version=1.0.1.0, Culture=neutral, PublicKeyToken=null"
iModelManager="MyModelManager" config-
File=".\AT\dotNet\Core\BusinessForm\test.u\config\BizFormConfig.xml"
CMDPATTERN="cmdPtn2" EVENTPATTERN="eventPtn2" />
    <View name="Activity2" type="syngo.Common.Activity.Activity, Activity,
Version=1.0.1.0,Culture=neutral,PublicKeyToken=null" config-
File=".\PresentationContent\UI_Activcity2.xml" CMDPATTERN="cmdPtn2"
EVENTPATTERN="eventPtn2" />
    <Controller name="ActivityWorkflowController" />
    </Activity>
- <SUBWORKFLOW xml:base="Subworkflow/Subworkflow1.xml">
- <TASKS>
- <TASK name="task1">
- <!--
  <xi:include href=".\Task\task1.xml" xpointer="xpointer(//Task) "/>
  -->
    <Model name="task1" ID="group1" PATTERNCMD="pat1"
PATTERNEVT="evt1" FILE=".\BusinessContent\step1_Model.xml"
xml:base="Task/task1.xml" />
```

```xml
<View name="task1" ID="group1" PATTERNCMD="pat1" PATTERNEVT="evt1"
FILE=".\PresentationContent\subworkflow_step1.xml"
xml:base="Task/task1.xml" />
  </TASK>
- <TASK name="task2">
- <!--
  <xi:include href=".\XML-Files\Task\task2.xml"
xpointer="xpointer(//Task) "/>
  -->
  <Model name="task2" ID="group2" PATTERNCMD="pat2"
PATTERNEVT="evt2" FILE=".\BusinessContent\step2_Model.xml"
xml:base="Task/task2.xml" />
  <View name="task2" ID="group2" PATTERNCMD="pat2" PATTERNEVT="evt2"
FILE=".\PresentationContent\subworkflow_step2.xml"
xml:base="Task/task2.xml" />
  </TASK>
- <TASK name="task3">
- <Task xml:base="Task/task3.xml">
  <Model name="task3" ID="group3" PATTERNCMD="pat3"
PATTERNEVT="evt3" FILE=".\BusinessContent\step3_Model.xml" />
  <View name="task3" ID="group3" PATTERNCMD="pat3" PATTERNEVT="evt3"
FILE=".\PresentationContent\subworkflow_step3.xml" />
  </Task>
  </TASK>
  </TASKS>
- <NAVIGATIONGRAPH name="navgraph1" startTask="task1">
- <!--
  <xi:include href=".\TaskNavigationGraph\TaskNavigationGraph.xml"
xpointer="xpointer(//NAVIGATIONGRAPH) "/>
  -->
- <NODE task="task1"
xml:base="TaskNavigationGraph/TaskNavigationGraph.xml">
    <navigateTo navigateValue="PREVIOUS" task="task3" />
    <navigateTo navigateValue="NEXT" task="task2" />
  </NODE>
- <NODE task="task2"
xml:base="TaskNavigationGraph/TaskNavigationGraph.xml">
    <navigateTo navigateValue="PREVIOUS" task="task1" />
    <navigateTo navigateValue="NEXT" task="task3" />
  </NODE>
- <NODE task="task3"
xml:base="TaskNavigationGraph/TaskNavigationGraph.xml">
    <navigateTo navigateValue="PREVIOUS" task="task2" />
    <navigateTo navigateValue="NEXT" task="task1" />
  </NODE>
  </NAVIGATIONGRAPH>
  </SUBWORKFLOW>
  </Activity>
- <Activity name="Activity3">
- <Activity xml:base="Activity/Activity3.xml">
  <Model name="MyModel_3" type="BusinessProcess.MyModel, BusinessProcess,
Version=1.0.1.0, Culture=neutral, PublicKeyToken=null"
iModelManager="MyModelManager" config-
File=".\AT\dotNet\Core\BusinessForm\test.u\config\BizFormConfig.xml"
CMDPATTERN="cmdPtn3" EVENTPATTERN="eventPtn3" />
  <View name="Activity3" type="syngo.Common.Activity.Activity, Activity,
Version=1.0.1.0,Culture=neutral,PublicKeyToken=null" config-
File="./PresentationContent/UI_Activity3.xml" CMDPATTERN="cmdPtn3"
EVENTPATTERN="eventPtn3" />
  <Controller name="ActivityWorkflowController" />
  </Activity>
- <!--
can be optional when activity has no subworkflow <includeSubwork-
flow href="./Subworkflow/Subworkflow3.xml"
xpointer="xpointer(//Subworkflow)"/>
  -->
  </Activity>
  </Activities>
- <navigationGraph name="Workflow_1" startView="Activity1"
state="State" statePersist="MemoryStatePersistence"
iViewManager="UserControlViewManager">
- <!--
  <xi:include
href=".\ActivityNavigationGraph\ActivityNavigationGraph.xml"
xpointer="xpointer(//navigationGraph)"/>
  -->
- <node view="Activity1"
xml:base="ActivityNavigationGraph/ActivityNavigationGraph.xml">
    <navigateTo navigateValue="previous" view="Activity3" />
    <navigateTo navigateValue="next" view="Activity2" />
```

```
    </node>
- <node view="Activity2"
xml:base="ActivityNavigationGraph/ActivityNavigationGraph.xml">
    <navigateTo navigateValue="previous" view="Activity1" />
    <navigateTo navigateValue="next" view="Activity3" />
    </node>
- <node view="Activity3"
xml:base="ActivityNavigationGraph/ActivityNavigationGraph.xml">
    <navigateTo navigateValue="previous" view="Activity2" />
    <navigateTo navigateValue="next" view="Activity1" />
    </node>
    -->
    </navigationGraph>
    </workflow>
    </document>
```

The use of the favored container based on at least one embodiment of the inventive system arrangement allows applications to be written whose business and presentation logic is based on the same pattern.

It is also possible to split an application into independent sub-applications and to have the sub-application executed by the configurable data flow machine in order to assist the user flexibly in his decisions.

Advantageously, implementation of at least one embodiment of the invention requires no fundamental changes, but rather can be added later, in principle, as a chip—particularly as a modified or additional computer program product.

Finally, it should be pointed out that the description of the example embodiments are, in principle, not to be understood as restrictive in terms of a particular physical implementation of the invention. In particular, it is obvious to a person skilled in the relevant art that embodiments of the invention can be implemented partially or completely in software and in a form distributed over a plurality of physical products—particularly including computer program products.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented runtime-configurable application container system for application development with user guidance, a computer of the system including a processor and a memory, the system comprising:
    a view component, implemented utilizing a first generic container associated with the computer, including a plurality of presentation forms, one of the plurality of presentation forms being intended for data viewing and for an input by a user, at a particular time;
    a model component, implemented utilizing a second generic container associated with the computer, including a plurality of business forms, each of the plurality of business forms logically corresponding to at least one of the plurality of presentation forms, and, at a particular time, being intended for at least one of storing, processing, and retrieving the data;
    a controller component, associated with the computer, configured to forward at least one of the user input and data processing to the model component, the controller component further configured to forward at least one of a requested and a processed data to at least one of the plurality of presentation forms, and the controller component further configured to provide a changeover between the two or more view components;
    a process flow component, associated with the computer, configured to provide at least one runtime-configurable sequence for the changeover between the two or more view components, the changeover between the two or more view components automatically triggering a changeover in a corresponding plurality of business forms; and
    a state manager component, associated with the computer, configured to store states of other parts of the system upon the system being suspended and configured to restore the states upon the system resuming, wherein
        the first and second generic containers are structurally symmetrical, and
        the first and second generic containers are associated with different processes within an operating system operating on the computer.

2. The computer-implemented runtime-configurable application container system as claimed in claim 1, wherein the plurality of presentation forms and, if appropriate, the plurality of business forms are in a hierarchical arrangement, so that the sequence of the changeover within one hierarchical level takes place when the sequence of the changeover in the next lowest hierarchical level has been performed.

3. The computer-implemented runtime-configurable application container system as claimed in claim 1, wherein the process flow component is configured to take prescribed events during the user input in one of the plurality of presentation form as a basis for instructing the controller component to use the stipulated sequence to change over between the two or more view components and, if appropriate, between the corresponding plurality of business forms.

4. The computer-implemented runtime-configurable application container system as claimed in claim 1, wherein the sequence of presentation forms is determined by at least one configuration file for the process flow component.

5. The computer-implemented runtime-configurable application container system as claimed in claim 1, wherein the changeovers are triggered by at least one preconfigurable event.

6. The computer-implemented runtime-configurable application container system as claimed in claim 1, further comprising a view manager configured to produce generic front-end program components for the view component.

7. The computer-implemented runtime-configurable application container system as claimed in claim 1, further comprising a model manager configured to produce generic back-end program components for the model component.

8. The computer-implemented runtime-configurable application container system as claimed in claim 1, wherein the controller component includes apparatuses configured to forward events from and to the model components and view components.

9. The computer-implemented runtime-configurable application container system as claimed in claim 1, wherein the controller component includes a program code and is configured to process the program code, the program code being coded to produce the plurality of presentation forms of the view component.

10. The computer-implemented runtime-configurable application container system as claimed in claim 9, wherein the program code is based on a script.

11. The computer-implemented runtime-configurable application container system as claimed in claim 1, wherein the system arrangement includes at least one further view component for local use at an operating system level and at least one further view component for network use using network protocols.

12. The computer-implemented runtime-configurable application container system as claimed in claim 1, further comprising means for data buffer-storage upon the two or more view components being changed over.

13. The computer-implemented runtime-configurable application container system as claimed in claim 12, wherein the data buffer-storage is performed by the process flow component and is performed in a memory area of the controller component.

14. The computer-implemented runtime-configurable application container system as claimed in claim 1, wherein a program code to produce and to configure the components of the system is a code written in a script language.

15. A method for application development using a computer-implemented run-time configurable application container system, with automated user guidance, the method comprising:
providing a view component, implemented utilizing a first generic container, including a plurality of presentation forms, one of the plurality of presentation forms being intended for data viewing and for an input by a user, at a particular time;
providing a model component, implemented utilizing a second generic container, including a plurality of business forms, each of the plurality of business forms logically corresponding to at least one of the plurality of presentation forms, and, at a particular time, being intended for at least one of storing, processing, and retrieving the data;
forwarding, by a controller component, at least one of the user input and data processing to the model component, and at least one of a requested and a processed data to at least one of the plurality of presentation forms;
providing a changeover, by the controller component, between two or more view components;
providing at least one runtime-configurable sequence for the changeover between the two or more view components, by a process flow component, the changeover between the two or more view components automatically triggering a changeover in a corresponding plurality of business forms; and
storing states of other parts of the system, by a state manager component, upon the system being suspended and restoring the states upon the system resuming, wherein
the first and second generic containers are structurally symmetrical, and
the first and second generic containers are associated with different processes within an operating system operating on a computer.

16. A non-transitory computer readable medium including a computer program product stored thereon, the computer program product comprising a run-time configurable application container logic that when executed on a computer, causes the computer to execute steps including:
providing a view component, implemented utilizing a first generic container, including a plurality of presentation forms, one of the plurality of presentation forms being intended for data viewing and for an input by a user, at a particular time;
providing a model component, implemented utilizing a second generic container, including a plurality of business forms, each of the plurality of business forms logically corresponding to at least one of the plurality of presentation forms, and, at a particular time, being intended for at least one of storing, processing, and retrieving the data;
forwarding at least one of the user input and data processing to the model component, and forwarding at least one of a requested and a processed data to at least one of the plurality of presentation forms;
providing a changeover between two or more view components;
providing at least one runtime-configurable sequence for the changeover between the two or more view components, the changeover between the two or more view components automatically triggering a changeover in a corresponding plurality of business forms; and
storing states of other parts of the computer program product upon the computer program product being suspended and restoring the states upon the computer program product resuming, wherein
the first and second generic containers are structurally symmetrical, and
the first and second generic containers are associated with different processes within an operating system operating on a computer.

* * * * *